May 17, 1966 E. M. BRADLEY ETAL 3,252,151

DATA STORAGE APPARATUS

Filed June 21, 1961

INVENTORS
EDWARD MICHAEL BRADLEY
JOHN BERNARD JAMES
BY Kane and Nydick
ATTORNEYS

United States Patent Office 3,252,151
Patented May 17, 1966

3,252,151

DATA STORAGE APPARATUS

Edward Michael Bradley and John Bernard James, Stevenage, England, assignors to International Computers and Tabulators Limited, London, England Filed June 21, 1961, Ser. No. 118,561
Claims priority, application Great Britain, June 29, 1960, 22,762/60
3 Claims. (Cl. 340—174)

This invention relates to data storage apparatus employing magnetic films.

British patent application No. 19,492/59 describes data storage elements using anisotropic magnetic films. These films have an "easy" direction of magnetization with which the magnetization vector is aligned in the absence of an applied magnetic field. The films also have a "hard" direction of magnetization which is perpendicular to the easy direction.

A storage element using a film of this kind has two stable magnetic states and may be used for the storage of binary information. The element may be said to be in the binary zero state when the magnetization vector is aligned with the easy direction in one sense. The application of a suitable magnetic field will cause the magnetization vector to rotate through 180° to be aligned with the easy direction in the opposite sense and the element may then be said to be in the binary one state.

The patent application referred to above describes in detail the arrangements for controlling switching of the element from one state to the other to store binary information and also describes a manner in which such stored information may be read out. In the foregoing application the storage elements are switched under control of driving currents applied to conductors linked with the film, a first one of these conductors being aligned with the plane of the film and arranged at a small angle with respect to the easy direction of magnetization while a second conductor is also aligned with the plane of the film but is approximately at right angles to the first conductor. The driving currents are always applied to the conductors in the same sense, that is, the current in each conductor is unidirectional. While this arrangement is satisfactory if the driving currents are derived from unidirectionally conducting driving sources, it is frequently desirable to control the operation of the storage elements from bidirectional sources, for example, pulse-operated transformers or selection and driving networks including ferrite cores. Under these circumstances in order to produce the required driving currents it becomes necessary to incorporate unidirectional devices, such as diodes in the driving circuits with a consequent increase in the complexity and cost of the apparatus.

Hence, it is an object of the invention to provide an improved data storage device employing a thin magnetic film in which the storage of a data item is controlled by magnetic fields each applied in two opposite senses during a cycle of operation.

It is another object of the invention to provide an improved data storage matrix utilising a plurality of magnetic film storage elements each controlled by magnetic fields each applied in two opposite senses during a cycle of operation.

According to the invention a data storage device includes a thin magnetic film element having mutually perpendicular easy and hard axes of magnetization switchable predominantly by domain rotation between two opposite stable states of remanence respectively representing binary digits of opposite significance in which the magnetization vector is aligned with the easy axis in a direction dependent upon the significance of the binary digit, means for producing during a reading phase of an operating cycle a magnetic field substantially aligned with the hard axis in one sense and for producing during a writing phase of the cycle a magnetic field substantially aligned with the hard axis in the opposite sense concurrently with a magnetic field substantially aligned with the easy axis in one or the opposite sense in dependence upon the significance of the binary digit to be written.

The magnetic fields may be derived from bidirectional driving currents applied to a pair of mutually perpendicular conductors lying in a plane parallel and adjacent to a planar substrate supporting the film. Output signals may be induced in a further conductor in response to the rotation of the magnetization vector of the film. A number of storage devices may be supported in matrix formation on a common substrate, the film elements being in the form of independent spots of film or of independently switchable areas occurring in a continuous film. The devices may be arranged in rows and columns respectively substantially aligned with the easy and hard axes of the film and having common row and column driving conductors. Such a matrix may be used for storing words of binary digits, each word being stored in a location formed by a row of elements and a location may be selected during an operating cycle by applying a current to the row required conductor, the applied current flowing in one direction during the reading phase and in the opposite direction during the writing phase.

Apparatus embodying the present invention will now be described, by way of example, with reference to the accompanying drawing, in which.

Figures 1, 2:
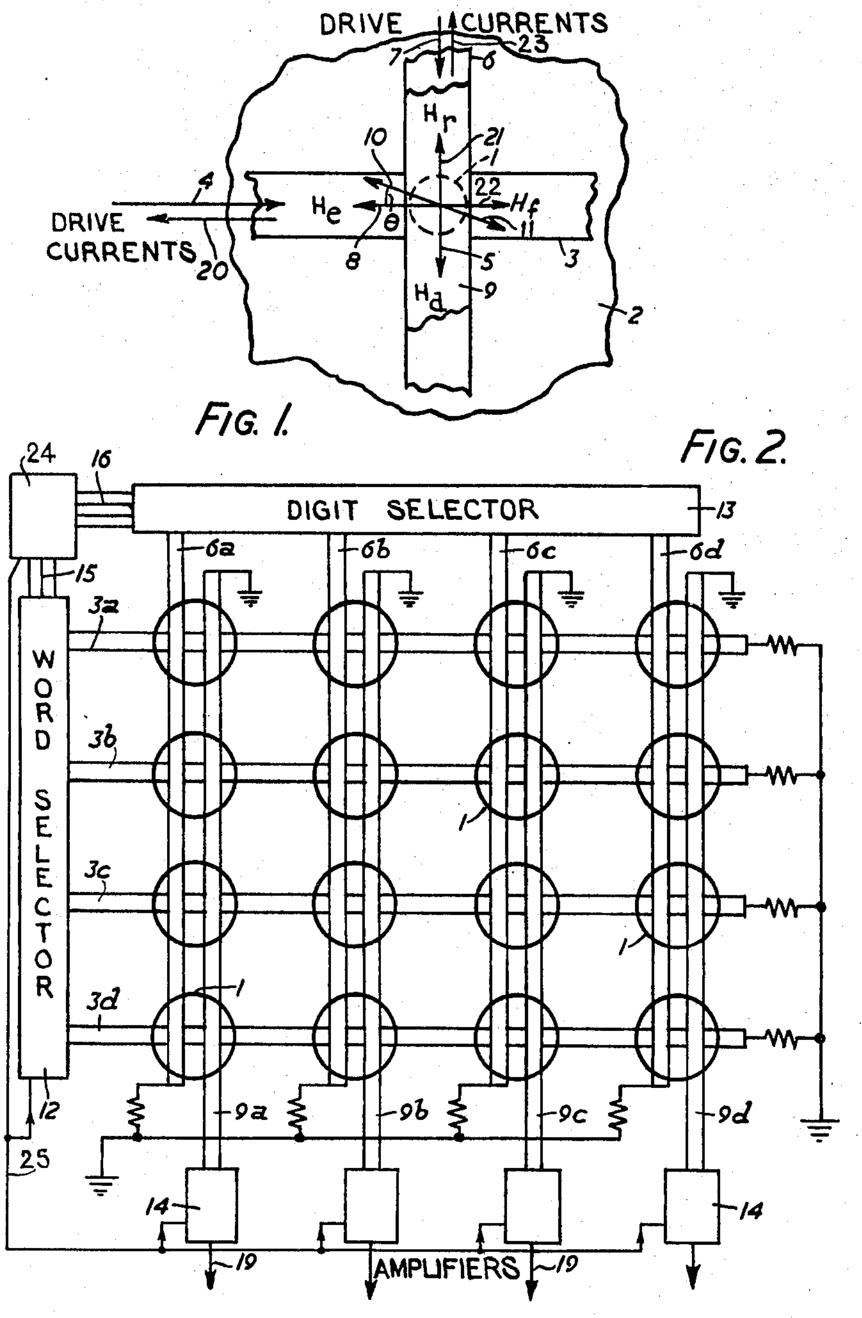
FIGURE 1 shows a single film storage element.
FIGURE 2 is a diagram illustrating a storage matrix utilising a plurality of individual storage elements.

The physical construction of a storage element is similar to that described in the above-mentioned patent application. A spot of anisotropic magnetic film 1 is deposited on a substrate 2. Over the spot 1 is a strip conductor 3.

Two other strip conductors 6 and 9 lie over the spot 1 and are at right angles to the conductor 3. The conductors 3 and 6 are used to carry drive currents, and the conductor 9 is used for pick-up purposes, signals being induced therein when the magnetic state of the film is changed. The conductors 3, 6 and 9 may be copper strips, or they may be deposited or plated, for example. As is well known in storage devices of this kind, the conductors are insulated from each other and from the film by suitable insulating layers. For the sake of clarity, however, the insulation layers are omitted from the drawing. The substrate 2 may be glass, for example, or it may be a non-magnetic conductor. This latter form of construction is shown and described in an article entitled "Making Reproducible Magnetic Film Memories" by E. M. Bradley, published in "Electronics" dated September 9, 1960. The sequence in which the conductors are laid over the film 1 may be different. For example, the pick-up conductor 9 may be next to the film to provide maximum coupling. The return path for the conductor 9 may be provided by a further similar conductor, or by the substrate itself if it is conductive.

In the particular form of storage device described in the article referred to above, the film deposited on the substrate is continuous, for example as indicated by the area referenced 2 in FIGURE 1, and the storage element consists of an area of film as indicated by reference 1, the area 1 being that part of the film which is effective to be switched by the applied magnetic fields. The area 1 will not be circular in this case, the actual shape depending upon the fields produced by the drive conductors.

It has previously been proposed, in thin film storage devices constructed in the manner described, to arrange that the driving conductors are aligned at a small angle to the easy and hard directions of the film. This mode of construction is shown in FIGURE 1, where the easy axis of magnetization lies in the direction indicated by arrows 10 and 11. It will be apparent, therefore, that if the arrow 10, for example, indicates the direction of the magnetization vector corresponding to the binary zero state then the arrow 11 indicates the vector direction corresponding to the binary one state. The drive conductor 3 then lies at a small angle $\theta$ to the easy axis. The angle $\theta$ may be 5° in a practical case but for the sake of clarity this angular displacement is exaggerated in the figure.

The application of a drive current to the conductor 3 produces a magnetic field at right angles thereto. The sense of the magnetic field produced is such that the magnetization vector is turned either clockwise or anticlockwise in dependence upon the direction of flow of the drive current. For the sake of simplicity of explanation, the magnetic field will be described as having a direction corresponding to the direction into which it tends to turn the vector. Thus a current flowing in the direction indicated by arrow 4 produces a substantially uniform field $H_d$ in the film in the direction indicated by arrow 5 and conversely a current flowing in the direction of arrow 20 produces a field $H_r$ in the direction indicated by arrow 21.

Similarly a drive current applied to conductor 6 in the direction indicated by arrow 7 produces a field $H_e$ in the direction indicated by arrow 8 and if the direction of current flow is reversed into the direction indicated by arrow 23 a field $H_f$ is produced in the direction indicated by arrow 22.

In order to illustrate one mode of operation of the element in which a bidirectional driving current is applied to the conductor 3 it will be assumed that the magnetization vector lies initially in the direction of arrow 10 and that this direction corresponds to the binary zero state. In the mode of operation to be considered initially the effect of reversing the drive current applied to the conductor 6 will not be considered. A drive current pulse of sufficient amplitude to produce a field $H_d$ greater than that required to saturate the film in the hard direction is now passed through the conductor 3, in the direction of arrow 4.

Domain rotation occurs in the film and the magnetization vector is aligned with the direction of the applied field, that is, in the direction of the arrow 5. The magnetization vector thus rotates through an obtuse angle from its initial position in order to align in the direction of the arrow 5 and in consequence passes the hard axis. Hence, after cessation of the drive pulse, the vector will not return to the original position but will instead align in the direction 11. Thus, the application of this drive current only to the conductor 3 in the direction 4 when the film is in the zero state produces a permanent change in the state of the film by causing the magnetization vector to rotate through 180°. Hence, the application of this driving current alone to the element will cause the element to store a binary one. However, if it is required to store a binary zero when operating in this mode the element is required to remain in an unswitched state. Consequently it is necessary to provide an inhibiting field to prevent switching taking place whenever a binary zero is to be stored.

For this purpose a second, inhibiting, driving current is applied in the direction indicated by arrow 7 to the conductor 6 to produce the field $H_e$ in the direction indicated by the arrow 8. The magnitude of the field $H_e$ is such that when it occurs concurrently with the field $H_d$ the magnetization vector does not rotate sufficiently to pass the hard axis and in consequence returns to its initial position, aligned in the direction indicated by the arrow 10, after the driving currents have ceased. It is convenient to make the drive pulse on the conductor 6 start before, and finish after, the drive pulse on the conductor 3. This ensures that the field $H_e$ is applied to the film during the turn off time of the field $H_d$. Thus, concurrent application of these drive pulses to the two conductors prevents switching of the film and ensures that it remains in the binary zero state.

It will be appreciated that, using this arrangement to control switching of the film, the values of the fields $H_d$ and $H_e$ and consequently the values of the drive currents producing them are not critical. For example, the minimum magnitude of the field $H_d$ is that which will cause the magnetization vector to rotate through the 90° position corresponding to the hard axis and the minimum value of the field $H_e$ is that which, when applied to the film concurrently with the field $H_d$ is sufficient to prevent the rotation of the magnetization vector through the direction of the hard axis.

A signal indicative of the state of the film may be obtained by applying an interrogating drive current pulse to the conductor 3 in the direction of the arrow 20, to produce the field $H_r$ in the direction of the arrow 21. If this reversed drive current is at least equal to the field required to saturate the film along the hard axis, the field produced causes the magnetization vector to rotate into alignment with the direction of the arrow 21. If the element is storing a binary zero, the rotation of the vector is in a clockwise sense and induces a voltage pulse, for example of positive polarity, in the pick-up conductor 9. The vector will then restore to its original position in alignment with the direction of the arrow 10 when the interrogating drive pulse ceases and since this rotation is in the opposite sense a negative pulse is induced in the pick-up conductor 9.

If, however, the element had been storing a binary one when the interrogating pulse was applied, the magnetization vector would have rotated in an anticlockwise direction from alignment with the direction of the arrow 11 to that of arrow 21, passing through the hard axis. This movement of the vector induces a voltage pulse of negative polarity in the pick-up conductor 9. As in the previous case this pulse is followed by a further negative pulse as the vector rotates to a position in alignment with the direction of the arrow 10 after the interrogating pulse ceases.

Thus, it will be seen that, with the configuration shown in FIGURE 1, the application of an interrogating pulse to the conductor 3 only resets the film to the staate corresponding to binary zero if it was previously in the binary one state and thereby generates two pulses of the same polarity in the pick-up conductor. If the film is already in the zero state, the interrogating pulse leaves the state unaltered and generates two pulses of unlike polarity in the pick-up conductor. Hence the state of the film prior to the application of the interrogating pulse may be determined by testing the polarity of the pulse produced in the pick-up conductor on the occurrence of the leading edge of the drive pulse and after the interrogating pulse has ceased the element will always be left in the zero or normal state. It will be appreciated that in an alternative mode of operation the element may be non-destructively read out by employing an interrogating drive current of a value less than the saturation value such that the magnetization vector does not pass through the hard axis from the binary one direction.

This mode of operation, however, requires that the value of the interrogating current should be accurately controlled.

Since the drive currents required for writing binary digits into the element and for reading out from the element are in opposite directions it is convenient to employ a mode of operation in which a cycle of operation of the element contains two phases, one for reading and the other for writing. The minimum magnitude of the field $H_r$ produced by the interrogating pulse is set by the same considerations as for the field $H_d$ and it is convenient to derive the driving currents for producing these fields from a single source producing a symmetrical bidirectional output. During the first or reading phase a driving current is applied to the conductor 3 in the direction of arrow 20 to produce the field $H_r$ as described above for the interrogating pulse. During this phase stored information can be read out by gating the leading edge of the output from the pick-up conductor 9. Alternatively the output signals may be inhibited by closing these gates and in this case the driving current merely constitutes a resetting pulse. This reading phase is followed immediately by a writing phase in which the driving current applied to the conductor 3 is reversed and now flows in the direction of the arrow 4. This current, if necessary in conjunction with current applied to the conductor 6, allows new information to be stored in the element in the manner previously described or may alternatively be used for re-writing information read out during the first phase. If the operation is solely required to be one of reading out, the application of the inhibiting current to the conductor 6 ensures that the element remains in the reset state at the end of the operation.

Thus the foregoing operations are conveniently controlled by a current source such as a transformer, for example, having an output consisting of a current pulse of one polarity followed by a second pulse of opposite polarity. It will also be apparent that the selection and control of a storage element in this way may equally well be accomplished by the use of conventional ferrite core driving circuits.

The modes of operation described above have required the reversal of driving current applied to the conductor 3 for the two phases during a single operating cycle. During the writing phase, however, only a unidirectional driving current applied to the conductor 6 has been described and this driving current is applied only for the writing of one of the binary digits. The digit drive current is also conveniently derived from a bidirectional current source and under these circumstances the current applied to the conductor 6 flows in one direction, for example in the direction of the arrow 7 to write a binary zero and in the opposite direction, for example in the direction of arrow 23 to write a binary one. Current flowing in the direction of the arrow 7 produces a field $H_e$ in the direction of the arrow 8, while current flowing in the direction of arrow 23 produces a field $H_f$ of similar magnitude in the direction of arrow 22.

The use of bidirectional digit driving currents in this way has the advantage that the tolerance of alignment of the driving conductors with the easy and hard axes is increased. To illustrate this point consider the modes of operation, described earlier, in which a unidirectional digit current is employed. In these cases since the writing of only one digit is associated with a drive current applied to conductor 6, the angle $\theta$ through which the conductors are tilted with respect to the axes of the film must be sufficient to ensure that in the absence of the inhibiting digit drive field $H_e$ the application of the field $H_d$ takes the magnetization vector past the hard axes. The maximum limit of the angle $\theta$ is determined by the magnitude of the inhibiting field $H_e$ and in a practical case the tolerance limits for the angle $\phi$ have been found to be from 2° to 8° approximately. Since the field $H_e$ must be capable of restraining rotation of the vector past the hard axis even when the maximum angle of tilt exists it follows that an equal and opposite field $H_f$ will cause a like modification of the vector rotation with a tilt of opposite sense. Thus, the mode of operation using mutually reversed digit drive currents for writing binary digits zero and one respectively ensures correct operation irrespective of the sense of tilt of the conductors with respect to the easy and hard axes in a practical case under similar operating conditions and using driving currents of similar magnitudes, the tolerance limits for the angle $\theta$ noted above have been increased from −8° to +8° in this way.

It will be appreciated that the angle $\theta$ is in any case quite small and the alignment of the conductors will be referred to hereinafter as substantially aligned with the easy or hard axes of the film as the case may be, it being understood that this alignment is within the tolerance limits of the angle $\theta$ for correct operation under the particular operating conditions chosen. A number of storage elements may be arranged in matrix formation and the foregoing modes of operation may be employed for writing and reading digits into and from the elements. FIGURE 2 shows, by way of example, an arrangement of elements in a four-by-four matrix, although it will be obvious that the number of elements in the rows and/or columns may be varied as may be required for any particular purpose.

Each of the rows of elements may be considered as a storage location for a word of binary digits. A particular location may then be selected by a word selection arrangement and the digits of the selected word may be read and written by the appropriate operation of a digit drive selector.

Each of the conductors *3a–3d*, corresponding to the conductor 3 of FIGURE 1, is common to four individual film elements 1, which are schematically indicated in FIGURE 2, and is connected to a conventional word selection network 12 having ferrite cores as driving elements for supplying the necessary driving currents. The conductors *6a–6d* corresponding to the conductor 6 of FIGURE 1, are common to a column of four film elements and are connected to a digit selector 13.

The conductors *9a–9d*, corresponding to the conductor 9 of FIGURE 1, are each connected to an amplifier 14. The conductors *6a–6d* have been shown separated from the conductors *9a–9d*, and the positions of the film elements have been schematically indicated for the sake of clarity of illustration.

The required word storage location is selected by the apparatus ot which the storage matrix is linked, for example a computer 24. The computer 24 contains a conventional address register which specifies the required location address and passes coded address signals over lines 15 to the word selection network 12. The network includes a number of ferrite cores, one of which is linked with each of the word drive conductor *3a* to *3d*. The ferrite core associated with the required location, for example, that associated with the word drive conductor *3c*, is set and then reset under control of timing or clock pulses derived over a line 25 from the computer. The setting and resetting of the core induces a driving current in the linked word drive conductor *3c*. The driving current flows first in one direction during the reading phase and then in the opposite direction during the writing phase. Hence, during the reading phase, the magnetic field $H_r$ is produced in each element linked with the conductor *3c* and the field $H_d$ is produced in each element during the writing phase.

The conductors *9a* to *9d* carry signals during the reading phase the signals having leading edges of a polarity determined by the digits stored in the elements of the selected location with which the conductors *9a* to *9d* are linked. The amplifiers 14 are conditioned to respond to the leading edge polarity corresponding to the storage of a binary one and a connection from the clock pulse line 25 to each of the amplifiers 14 provides a strobing signal so that the final output from an amplifier 14 occurs only if the associated element had been storing a binary one.

The computer 24 also includes a register which contains the binary digits to be written into the selected location, and during the writing phase signals representing these digits are applied over lines 16 to the digit drive selector 13. The digit drive selector 13 includes a group of transformers, one associated with each of the conductors *6a* to *6d*. The primary windings of the transformers are in a driving circuit which is gated by a suitably delayed strobing pulse to produce during the writing phase, an energizing pulse corresponding in sign to the particular significance of the digit to be written. The secondary windings of the transformers are each connected to the appropriate one of the conductors *6a* to *6d*. Thus the digit drive currents applied to the conductors *6a* to *6d* to produce the required fields $H_e$ or $H_f$ depending on the significance of the digits to be written.

It will be seen that in the preceding descriptions the mode of operation of the storage elements either individually or in a storage matrix requires the provision of bidirectional driving currents to conductors substantially aligned with both easy and hard axes of magnetization of the film. The use of a bidirectional word driving current provides a simple read-write cycle of operation without requiring complex selection circuits and the use of a bidirectional digit driving current, while still retaining the advantages of simple driving circuits also allows a greater manufacturing tolerance on the permissible angle $\theta$ by which the conductors are tilted with respect to the axes of the film.

While it will be evident from the preceding description that the bidirectional currents may be provided for example by driving circuits including bistable devices, such as ferrite cores, or transformers, for example, it will also be appreciated that the practical advantage of greater manufacturing tolerance stems from the use of magnetic fields each of opposite senses linking with the film. Thus, the required mode of operation could be achieved by other forms of drive conductor, provided that the fields produced are respectively substantially aligned with the easy and hard axes of the film. For example, the required fields could be produced by providing a driving winding encircling each elementary area or in the case of a word oriented matrix by a word driving winding distributed over a complete word storage location. Further, the single driving conductors shown may be replaced by two conductors each carrying current only in one direction. For example, two word driving conductors may be provided for each storage location, the selection of the location conditioning them to carry a driving current in succession under control of timing signals. In this case the conductors would be coupled in opposite senses with the elements in the location.

We claim:

1. A data store including a magnetic thin film planar element having mutually perpendicular easy and hard axes of magnetization, the element being switchable predominantly by domain rotation between a first stable state in which the magnetization vector is aligned in one direction along the easy axis and a second stable state in which the magnetization vector is aligned in the opposite direction along the easy axis; a first conductor lying parallel to the plane of the element and aligned at a small angle to the easy axis; a second conductor lying parallel to the plane of the element and aligned perpendicular to said first conductor; a first current source operative in response to a control signal to generate sequentially a pair of current pulses of opposite polarity and substantially equal magnitude in said first conductor; a second current source selectively operable to generate a current pulse in said second conductor concurrently with one of said pair of pulses in said first conductor, said concurrent current pulse in said first and second conductors respectively being effective to switch said elements to said first stable state and the other pulse of said pair of pulses being effective to read out data stored by said element by rotating the magnetization vector away from the easy axis.

2. A data store including a magnetic thin film planar element having mutually perpendicular easy and hard axes of magnetization, the element being switchable predominantly by domain rotation between a first stable state in which the magnetization vector is aligned in one direction along the easy axis and a second stable state in which the magnetization vector is aligned in the opposite direction along the easy axis; a first conductor lying parallel to the plane of the element and aligned at a small angle to the easy axis; a second conductor lying parallel to the plane of the element and aligned perpendicular to the first conductor; a third conductor aligned parallel to said second conductor; a first current source operative in response to a control signal to generate sequentially first and second current pulses in said first conductor, said first pulse being of opposite polarity to said second pulse; a second current source selectively operable to generate a third current pulse in said second conductor concurrently with said second pulse in said first conductor; said first current pulse being effective to rotate the magnetization vector away from the easy axis thereby inducing a signal in said third conductor indicative of the stable state of the element and said second and third pulses together being effective to switch the element to said first stable state.

3. A data store including a magnetic thin film planar element having mutually perpendicular easy and hard axes of magnetization, the element being switchable predominantly by domain rotation between a first stable state in which the magnetization vector is aligned in one direction along the easy axis and a second stable state in which the magnetization vector is aligned in the opposite direction along the easy axis; a first conductor lying parallel to the plane of the element and aligned at a small angle to the easy axis; a second conductor lying parallel to the plane of the element and aligned perpendicular to the first conductor; a first current source operative in response to a control signal to generate sequentially first and second current pulses, in said first conductor, said first pulse being of opposite polarity to said second current pulse; a second current source operable to generate a current pulse selectively of first and second polarities in said second conductor concurrently with said second current pulse in said first conductor; a third conductor aligned parallel to said second conductor; said first current pulse being effective to cause rotational displacement of the magnetization vector and thereby to induce a signal in said third conductor indicative of the previous stable state of the element; and said second current pulse being effective in conjunction with the current pulse of first polarity to switch the element to said first stable state and effective in conjunction with the current pulse of second polarity to switch the element to said second stable state.

References Cited by the Examiner

UNITED STATES PATENTS

| | | | |
|---|---|---|---|
| 3,030,612 | 4/1962 | Rubens et al. | 340—174 |
| 3,054,094 | 9/1962 | Stuckert | 340—174 |
| 3,058,099 | 10/1962 | Williams | 340—174 |

BERNARD KONICK, *Primary Examiner.*

IRVING L. SRAGOW, *Examiner.*

J. W. MOFFITT, J. P. SCHERLACHER, *Assistant Examiners.*